US012031247B2

(12) United States Patent
Usta et al.

(10) Patent No.: US 12,031,247 B2
(45) Date of Patent: Jul. 9, 2024

(54) TEXTILE PRODUCTS MADE OF RECYCLED FIBERS

(71) Applicant: GREEN PETITION DIS TICARET ANONIM SIRKETI, Bursa (AR)

(72) Inventors: Özgür Usta, Bursa (AR); Kevser Ceren Muharrem, Bursa (AR)

(*) Notice: Subject to any disclaimer, the term of this patent is extended or adjusted under 35 U.S.C. 154(b) by 0 days.

(21) Appl. No.: 17/640,898

(22) PCT Filed: Sep. 4, 2020

(86) PCT No.: PCT/TR2020/050804
§ 371 (c)(1),
(2) Date: Mar. 7, 2022

(87) PCT Pub. No.: WO2021/045715
PCT Pub. Date: Mar. 11, 2021

(65) Prior Publication Data
US 2022/0333280 A1 Oct. 20, 2022

(30) Foreign Application Priority Data
Sep. 6, 2019 (TR) .................. 2019/13501

(51) Int. Cl.
D03D 27/08 (2006.01)
D02G 3/04 (2006.01)
D03D 1/00 (2006.01)
D03D 1/04 (2006.01)
D03D 15/217 (2021.01)
D03D 15/283 (2021.01)
D03D 15/47 (2021.01)
D03D 27/04 (2006.01)

(52) U.S. Cl.
CPC ............ D03D 15/47 (2021.01); D02G 3/04 (2013.01); D03D 1/0017 (2013.01); D03D 1/04 (2013.01); D03D 15/217 (2021.01); D03D 15/283 (2021.01); D03D 27/04 (2013.01); D10B 2201/02 (2013.01); D10B 2331/06 (2013.01)

(58) Field of Classification Search
CPC ........ D03D 15/47; D03D 1/0017; D03D 1/04; D03D 15/217; D03D 15/283; D03D 27/04; D03D 15/00; D03D 27/00; D02G 3/04; D10B 2201/02; D10B 2331/06; D10B 2331/04; Y02W 30/66; D01G 11/04
See application file for complete search history.

(56) References Cited

U.S. PATENT DOCUMENTS

| | | | | |
|---|---|---|---|---|
| 3,599,446 A | * | 8/1971 | Lawson | D04B 7/12 66/190 |
| 3,721,274 A | * | 3/1973 | Sherrill | D03D 27/08 26/69 R |
| 4,047,269 A | * | 9/1977 | Lochner | D04H 18/00 28/109 |
| 4,589,357 A | * | 5/1986 | Lincoln | C10L 5/44 110/232 |
| 4,726,400 A | * | 2/1988 | Heiman | D03D 27/08 139/396 |
| 5,265,979 A | * | 11/1993 | Hansen | C02F 11/008 405/266 |
| 5,471,720 A | | 12/1995 | Ball et al. | |
| 6,017,418 A | * | 1/2000 | Oriaran | D21H 21/20 162/111 |
| 6,059,928 A | * | 5/2000 | Van Luu | D21F 11/14 162/131 |
| 6,250,060 B1 | * | 6/2001 | Scheerer | D02G 3/04 57/328 |
| 6,432,504 B1 | * | 8/2002 | Yeh | D03D 11/00 428/85 |
| 6,546,965 B2 | * | 4/2003 | Hamby | D03D 27/08 139/420 A |
| 6,916,349 B2 | * | 7/2005 | Dischler | D06C 11/00 8/922 |
| 7,044,173 B2 | * | 5/2006 | Silver | A47K 10/02 139/420 R |
| 7,344,035 B1 | * | 3/2008 | Koopmann | D04B 1/025 210/507 |
| 8,695,151 B2 | * | 4/2014 | Dilyard | B32B 5/26 15/230 |
| 2002/0074100 A1 | * | 6/2002 | Yeh | D21F 11/14 162/168.3 |
| 2002/0096269 A1 | * | 7/2002 | Bouchette | D21C 5/02 162/264 |
| 2002/0104632 A1 | * | 8/2002 | Jimenez | D21H 21/285 162/158 |
| 2002/0119281 A1 | * | 8/2002 | Higgins | D06N 7/0073 428/95 |
| 2002/0132085 A1 | * | 9/2002 | Higgins | D06N 7/0086 428/95 |

(Continued)

FOREIGN PATENT DOCUMENTS

DE 19634050 A1 9/1997
TR 2015/02630 B 12/2017

OTHER PUBLICATIONS

International Search Report for corresponding PCT/TR2020/050804, dated Jan. 12, 2021.

(Continued)

Primary Examiner — Robert H Muromoto, Jr.
(74) Attorney, Agent, or Firm — Egbert, McDaniel & Swartz, PLLC

(57) ABSTRACT

A towel or peshtemal made from recycled materials that do not require any chemical treatment or dyeing in which the towel has a 60% water absorption rate and has 60% pile yarn, 20% warp yarn and 20% weft yarn. Each of the pile yarn, the warp yarn and the weft yarn is a blend of polyester yarn obtained from recycled polyester waste and cotton yarn of from recycled virgin textile cotton waste.

2 Claims, No Drawings

(56) References Cited

U.S. PATENT DOCUMENTS

| | | | |
|---|---|---|---|
| 2003/0136531 A1* | 7/2003 | Edwards | D21F 11/006 162/158 |
| 2003/0196772 A1* | 10/2003 | Awofeso | D21H 15/02 162/149 |
| 2004/0055659 A1* | 3/2004 | Hugh Silver | A47K 10/02 139/396 |
| 2005/0028955 A1* | 2/2005 | Winslow | D21H 27/38 162/164.3 |
| 2005/0080520 A1* | 4/2005 | Kline | B65F 1/0006 701/1 |
| 2005/0233107 A1* | 10/2005 | Hartman | D05C 17/023 428/95 |
| 2005/0274152 A1* | 12/2005 | Koopmann | D04B 1/04 66/194 |
| 2006/0289133 A1* | 12/2006 | Yeh | D21H 21/146 162/168.3 |
| 2007/0237807 A1* | 10/2007 | Luu | A01N 25/34 424/443 |
| 2008/0008865 A1* | 1/2008 | Luu | D21F 11/006 162/135 |
| 2008/0029235 A1* | 2/2008 | Edwards | D21F 11/14 162/111 |
| 2008/0292831 A1* | 11/2008 | Juriga | D05C 17/026 156/72 |
| 2009/0173055 A1* | 7/2009 | Silver | D02G 3/04 57/400 |
| 2010/0243186 A1* | 9/2010 | Bouplon | D21H 21/22 162/113 |
| 2010/0282359 A1* | 11/2010 | Rabin | D03D 15/283 139/420 R |
| 2011/0217503 A1* | 9/2011 | Flannery | B65D 75/20 428/156 |
| 2013/0171897 A1* | 7/2013 | Hsu Tang | B32B 5/20 442/76 |
| 2013/0189476 A1* | 7/2013 | Hsu Tang | B32B 37/02 156/66 |
| 2013/0209724 A1* | 8/2013 | Reiter | B32B 5/028 428/92 |
| 2013/0306189 A1* | 11/2013 | Rabin | D03D 27/08 139/396 |
| 2014/0259490 A1* | 9/2014 | Ballas | D21H 27/002 15/209.1 |
| 2015/0068695 A1* | 3/2015 | Edwards | D21H 27/007 162/111 |
| 2015/0136343 A1* | 5/2015 | Tausche | D21C 9/086 162/158 |
| 2015/0167210 A1* | 6/2015 | Tomlin | D02G 3/04 139/420 R |
| 2016/0097158 A1* | 4/2016 | Henriksson | D21C 5/02 162/190 |
| 2017/0107346 A1* | 4/2017 | Bokka | B29B 17/02 |
| 2018/0127920 A1* | 5/2018 | Mauler | D21H 27/38 |
| 2019/0021553 A1* | 1/2019 | Saas | D21H 27/30 |
| 2019/0153679 A1* | 5/2019 | Neuhoff | D05C 17/026 |
| 2019/0249370 A1* | 8/2019 | Lu | D21H 17/55 |
| 2020/0232125 A1* | 7/2020 | Dalton | D03D 15/283 |
| 2021/0262169 A1* | 8/2021 | Hietaniemi | D21H 17/375 |
| 2021/0372043 A1* | 12/2021 | Zheng | D06N 7/0081 |

OTHER PUBLICATIONS

Written Opinion of the International Searching Authority for corresponding PCT/TR2020/050804, dated Jan. 12, 2021.

* cited by examiner

TEXTILE PRODUCTS MADE OF RECYCLED FIBERS

TECHNICAL FIELD

The invention refers to the use of recycled fibers in the production of textile products such as towels, peshtemals used in baths, spas, saunas, hotels, swimming pools and beaches and of the packaging bags used in the packaging of the said products.

PRIOR ART

In parallel with the growing number of environmentally friendly activities in recent years, the preference of the consumers has shifted towards more natural products in a wide range of items from food to textile. With the growing environmental awareness, not only the aesthetic qualities of products, but also the positive and negative effects of the raw materials used in their production, play a significant role in the demands and preferences of the consumers.

Today, cellulosic materials such as cotton fiber are frequently used in the production of towels. To produce ready textile material from cellulosic materials, after cotton fiber is spun to make yarn and the woven or knit fabric is produced, several processes and stages must be carried out such as pre-treatment, which involves the steps of desizing, hydrophilization and bleaching, as well as dyeing and finishing. Therefore, ways are sought to develop alternative methods that are more nature compatible in comparison to all the above processes. Among the applications that studies are conducted, is notably the use of nature friendly materials or the use of recycled raw materials that are waste products of the textile industry, in pre-treatment, dyeing processes carried out in the production of towels.

In the prior art, the garment waste created in the production of apparel products and considered as cuttings are not disposed of but made into various semi-finished and finished goods through different recycling methods in order to be used in many sectors. In the patent application numbered U.S. Pat. No. 5,471,720A, one of the applications that cover the recycling of textile wastes, the recycling method of denim wastes is described as blending the fiber from the pre-consumer and/or post-consumer denim wastes with long fibers and spinning it to be used as weft yarn, warp yarn or knitting yarn. This is followed by the production of the fabric using these yarns.

The invention numbered TR 2015 02630 refers to a lining fabric used in the furniture industry and comprises a weft yarn produced from textile wastes. The said weft yarn is produced in a series of process stages that involve collecting textile wastes made up of fabric scraps, cutting these collected textile wastes into small pieces, turning these small pieces of textile waste into degenerated cotton, combing this cotton in the form of stripes, flattening the stripe-shaped cotton and finally spinning the flattened cotton in the desired thickness on a pirn.

In current applications, fibers produced by recycling textile wastes are used by blending them with at least one synthetic or regenerated cellulose fiber or conventional cotton. Therefore, the contribution of these products to the preservation of the environment is below the expected level. In addition, said products require the application of pre-treatment and dyeing processes after weaving.

In conclusion, due to the above issues and deficiencies, a novelty was needed in the said technical field.

OBJECT OF THE INVENTION

This invention refers to textile products made of recycled fibers, which meets the above requirements, eliminates the disadvantages and offers additional advantages.

The main object of the invention is to use recycled fibers in the production of textile products such as towels, peshtemals used in baths, spas, saunas, hotels, swimming pools and beaches and of the packaging bags used in the packaging of the said products.

The object of the invention is to enable the use of yarn from textile wastes and plastic products in the production textile products such as towels and peshtemals as well as in the production of the packaging bags used in the packaging of the said products.

The object of the invention is to make use of yarn from waste textile scraps and plastic products to produce more environmentally friendly and affordable products.

The object of the invention is to make use of yarn from waste textile scraps and plastic products to produce towels and peshtemals that have high stability after washing, increased wet and dry fastness, are capable of drying quickly and come in a wide selection of colors.

One object of the invention is to eliminate the need for the use of dyes and chemical.

Another object of the invention is to enable the production of the packaging bags for towels and peshtemals through a nature friendly method that does not harm the environment.

For the achievement of the above objects, the invention refers to textile products such as towels and peshtemals used in baths, spas, saunas, hotels, swimming pools and beaches characterized in that they comprise pile yarn and warp yarn created by blending the cotton fiber produced by recycling textile wastes made of 100% cotton with polyester (PES) fiber produced by recycling plastic materials.

The structural and characteristic features and all the advantages of the innovation will be more clearly understood by means of the following detailed description and therefore, the evaluation must be performed considering this detailed description.

DETAILED DESCRIPTION OF THE INVENTION

This detailed description describes the use of recycled fibers in the production of textile products such as towels, peshtemals used in baths, spas, saunas, hotels, swimming pools and beaches and of the packaging bags used in the packaging of the said products, only for the object of offering a better explanation on the invention and not to impose any limitations thereto.

The invention refers to the production of pile yarn and/or warp yarn used in weaving textile products such as towels and peshtemals by blending the cotton fiber produced by recycling textile wastes made of 100% cotton with polyester (PES) fiber produced by recycling plastic materials.

In this Method of Producing the Yarn Used in Weaving the Textile Products Such as Towels and Peshtemals as Well as the Packaging Bags Used in their Packaging that is the Subject of this Invention;

High-tenacity recycled PES fibers produced from the plastic materials collected as waste is blended with recycled cotton fiber from the textile waste set aside as cuttings at the garment stage of the t-shirts made of 100% cotton and yarn is produced of various yarn counts and at various cotton PES blend ratios and the yarn that is produced is used as pile yarn and warp yarn in weaving the towels and peshtemals.

In the production of the pile yarn and the warp yarn used in weaving the textile products as towels and peshtemal that are the subject of this invention, the textile waste set aside as cuttings are subjected to color sorting process before the recycling process. This allows the weaving of products in desired colors and patterns without a need for additional pre-treatment or a dyeing process.

In the preferred configuration of the invention, weft yarn made of cotton is used in weaving the towels and peshtemals.

Pile Yarn Blend Used in the Production of Textile Products that are the Subject of the Invention

| Contents | Usable Quantity by Weight (%). |
|---|---|
| Recycled cotton fiber | 90-50 |
| Recycled polyester (PES) fiber | 50-10 |

Warp Yarn Blend Used in the Production of Textile Products that are the Subject of the Invention

| Contents | Usable Quantity by Weight (%). |
|---|---|
| Recycled cotton fiber | 70-50 |
| Recycled polyester (PES) fiber | 50-30 |

In order to produce towels and peshtemals at desired technical performance values and in desired patterns within the scope of the invention, weaving process is carried out after determining the cotton/PES blend ratio and yarn count of pile yarns and warp yarns.

Textile products such as towels and peshtemals used in baths, spas, saunas, hotels, swimming pools and beaches must be lightweight and have high water absorption capacity because of their area of use. While the cotton/PES blend ratio of the warp yarn and pile yarn used in weaving the said textile products affects the water absorption capacity of the products, yarn counts affect their weight.

Pile yarn comprising 70% recycled cotton fiber with yarn count of 16/1 OE and 30% recycled PES fiber along with warp yarn comprising 60% recycled cotton fiber with a yarn count of 20/2 OE and 40% recycled PES fiber are used in weaving towels. Weft yarn used in the production is made of cotton and has a yarn count of 16/1 OE. The towel whose weaving process has been completed comprises 68% recycled cotton fiber by weight and 32% recycled PES fiber by weight.

Pile yarn comprising 70% recycled cotton fiber with yarn count of 16/1 OE and 30% recycled PES fiber along with warp yarn comprising 60% recycled cotton fiber with a yarn count of 20/2 OE and 40% recycled PES fiber are used in weaving peshtemals. Weft yarn used in the production is made of cotton and has a yarn count of 16/1 OE. The peshtemal whose weaving process has been completed comprises 67% recycled cotton fiber by weight and 33% recycled PES fiber by weight.

The ratios of pile, warp and weft yarns used in weaving the towels and peshtemals that are the subject of the invention are given in Table 1.

TABLE 1

The ratios of pile, warp and weft yarns used in weaving the towels and peshtemals

| Product | Pile yarn (%) | Warp yarn (%) | Weft yarn (%) |
|---|---|---|---|
| Towel | 60 | 20 | 20 |
| Peshtemal | 50 | 25 | 25 |

In the preferred configuration of the invention, pile and warp yarns of different yarn counts and cotton/PES blend ratios can also be used in weaving towels.

Example 1

The towel was woven using pile yarn comprising 70% recycled cotton fiber with yarn count of 12/1 OE and 30% recycled PES fiber, warp yarn comprising 60% recycled cotton fiber with a yarn count of 20/2 OE and 40% recycled PES fiber and weft yarn made of cotton with a yarn count of 16/1 OE. Percentage ratio of pile yarn, weft yarn and warp yarn used in the production is 70/15/15. The towel referred to in Example 1 comprises 68% recycled cotton fiber by weight and 32% recycled PES fiber.

Example 2

The towel was woven using pile yarn comprising 70% recycled cotton fiber with yarn count of 16/1 OE and 30% recycled PES fiber, warp yarn comprising 60% recycled cotton fiber with a yarn count of 20/2 OE and 40% recycled PES fiber and weft yarn made of cotton with a yarn count of 16/1 OE. Percentage ratio of pile yarn, weft yarn and warp yarn used in the production is 70/15/15. The towel referred to in Example 2 comprises 68% recycled cotton fiber by weight and 32% recycled PES fiber.

Example 3

The towel was woven using pile yarn comprising 50% recycled cotton fiber with yarn count of 30/2 OE and 50% recycled PES fiber, warp yarn comprising 60% recycled cotton fiber with a yarn count of 20/2 OE and 40% recycled PES fiber and weft yarn made of cotton with a yarn count of 16/1 OE. Percentage ratio of pile yarn, weft yarn and warp yarn used in the production is 70/15/15. The towel referred to in Example 3 comprises 60% recycled cotton fiber by weight and 40% recycled PES fiber.

Test results showed that the water absorption of the towel that is the subject of the invention was within the standard value range specified in ASTM D4772. Table-2 shows the water absorption of the towel that is the subject of the invention as per ASTM D4772.

TABLE-2

Water absorption test result of the towel that is the subject of the invention as per ASTM D4772

| | Water absorption rate (%) |
|---|---|
| ASTM D4772 standard | 60-80 |
| Towel subject of the invention | 60 |

In the preferred configuration of the invention, the packaging bag used in the packaging of the towels and peshtemals is woven with recycled yarn. The said yarn comprises 60% recycled cotton fiber by weight and 40% recycled PES fiber. In addition, items including the cord and the filling inside the cord used to close the packaging bag are produced from 100% recycled cotton/PES blend yarns that is the subject of this invention. Therefore, the packaging bag used to present the towel and peshtemal to consumers is 100% recycled.

The invention claimed is:

1. A towel made from recycled materials that do not require any chemical treatment or dyeing, the towel having a 60% water absorption rate with the use of weight ratios of 60% pile yarn and 20% warp yarn and 20% weft yarn, the towel comprising:
    the pile yarn being a blend of polyester, yarn obtained from recycled polyester waste and cotton yarn obtained from recycled virgin textile cotton waste, the polyester yarn being in a range of 10% to 50% by weight of the total weight of the pile yarn with a cotton yarn completing a remainder of the total weight of the pile yarn, the pile yarn being a pile yarn count number between 12/1 open ended and 30/2 open ended;
    the warp yarn being a blend of a polyester yarn obtained from the recycled polyester waste and the cotton yarn obtained from recycled virgin textile cotton waste, the polyester yarn of the warp yarn being in a range of 50% to 70% by weight of total weight of the warp yarn with the cotton yarn completing a remainder of total weight of the warp yarn, the warp yarn having a yarn count number of 20/2 open ended; and
    the weft yarn being a blend of polyester yarn obtained from the recycled polyester waste and the cotton yarn obtained from recycled virgin textile cotton waste, the polyester yarn of the weft yarn being in a range of 10% to 50% by weight of a total weight of the weft yarn with the cotton yarn completing a remainder of a total weight of the welt yarn, the weft yarn having yarn count number of 20/2 open ended.

2. A peshtemal made from recycled materials that do not require any chemical treatment or dyeing, the peshtemal having a 60% water absorption rate with the use of weight ratio of 50% pile yarn and 0.25% warp yarn and 0.25% well yarn, the peshtemal comprising:
    the pile yarn being a blend of polyester yarn obtained from recycled polyester waste and cotton yarn obtained from recycled virgin textile cotton waste, the polyester yarn being in a range of 10% to 50% by weight of the total weight of the pile yarn with a cotton yarn completing a remainder of Me total weight of the pile yarn, the pile yarn being a pile yarn count number between 12/1 open end and 30/2 open end;
    the warp yarn being a blend of a polyester yarn obtained from the recycled polyester waste and the cotton yarn obtained from recycled virgin textile cotton waste, the polyester yarn of the warp yarn being in a range of 50% to 70% by weight of total weight of the warp yarn with the cotton yarn completing a remainder of total weight of the warp yarn, the warp yarn having a yarn count number of 20/2 open ended:
    the weft yarn being a blend of polyester yarn obtained from the recycled polyester waste and the cotton yarn obtained from recycled virgin textile cotton waste, the polyester yarn of the weft yarn being in a range of 50% to 70% by weight of a total weight of the weft yarn with the cotton yarn completing a remainder of a total weight of the weft yarn, the weft yarn having a yarn count number of 20/2 open ended.

* * * * *